United States Patent [19]
Coursey et al.

[11] Patent Number: 5,995,839
[45] Date of Patent: Nov. 30, 1999

[54] PRIVATE RADIOTELEPHONE SYSTEM WITH ENHANCED TELEPHONE SYSTEM INTERFACE

[75] Inventors: Cameron Kelly Coursey, Cedar Park; Jesse Bradley Bridges, Austin, both of Tex.; Thomas Edward Ferry, Chesterfield, Mo.; Steven Anthony Harbin, Austin, Tex.; Ramgopal Kankara V Reddy, Austin, Tex.; Gregory Gene Williams, Austin, Tex.

[73] Assignee: Southwestern Bell Technology Resources, Inc., Austin, Tex.

[21] Appl. No.: 08/697,173

[22] Filed: Aug. 20, 1996

[51] Int. Cl.⁶ ........................................................ H04Q 7/32
[52] U.S. Cl. ........................... 455/445; 455/553; 455/461; 455/517; 455/436
[58] Field of Search .................................... 455/403, 426, 455/436, 450, 452, 445, 465, 464, 461, 458, 456, 444, 513, 552, 553, 417, 422, 432, 439, 428, 462; 379/156, 165, 198

[56] References Cited

U.S. PATENT DOCUMENTS

| | | | |
|---|---|---|---|
| 566,399 | 3/1896 | Bales et al. | 455/419 |
| 5,282,239 | 1/1994 | Yokoi et al. | 455/465 |
| 5,313,618 | 5/1994 | Pawloski | 395/500 |
| 5,367,558 | 11/1994 | Gillig et al. | 455/426 |
| 5,392,331 | 2/1995 | Patsiokas et al. | 379/63 |
| 5,438,609 | 8/1995 | Yahagi | 455/458 |
| 5,442,680 | 8/1995 | Schellinger et al. | 379/58 |
| 5,475,735 | 12/1995 | Williams et al. | 455/403 |
| 5,507,020 | 4/1996 | Lee | 455/137 |
| 5,535,259 | 7/1996 | Dent et al. | 455/452 |
| 5,544,227 | 8/1996 | Blust et al. | 455/426 |
| 5,574,976 | 11/1996 | Schellinger | 455/426 |
| 5,581,597 | 12/1996 | Dent et al. | 455/450 |
| 5,659,598 | 8/1997 | Byrne et al. | 455/436 |
| 5,722,073 | 2/1998 | Wallstedt et al. | 455/436 |
| 5,787,355 | 4/1999 | Bannister et al. | 379/156 |

*Primary Examiner*—Dwayne D. Bost
*Assistant Examiner*—Jean A. Gelin
*Attorney, Agent, or Firm*—Andrew J. Dillon

[57] ABSTRACT

The personal communication system of the present invention includes one or more mobile stations which operate in conjunction with a Private/Residential Base Station and a Mobile Station Emulator to provide seamless rerouting of existing telephone connections between the Private/Residential Base Station and a cellular telephone system. The Mobile Station Emulator associated with the Private/Residential Base Station communicates with either a cellular network or a personal communications service (PCS) over a digital channel to enable hand-in and hand-out, control the emissions of the Private/Residential Base Station, and provide control and monitoring functions to other devices connected to the Private/Residential Base Station. Calls directed to a mobile station may be coupled to the Private/Residential Base Station via a landline connection to the public-switched telephone network or via a radio-frequency link between the mobile station and a cellular network, either directly or via the Mobile Station Emulator. Devices that are controlled and/or monitored from the cellular network may be connected to the Private/Residential Base Station via a radio frequency link or via a wired connection to either the Private/Residential Base Station or the Mobile Station Emulator.

16 Claims, 10 Drawing Sheets

PRIVATE RADIOTELEPHONE SYSTEM WITH ENHANCED TELEPHONE SYSTEM INTERFACE

BACKGROUND OF THE INVENTION

1. Technical Field

The present invention relates in general to telephone communication systems and, in particular, to personal telephone communication systems permitting telephone connections via a local radio network and via an external radio network. Still more particularly, the present invention relates to a method and system which permits seamless rerouting of existing telephone connections between the local radio network and the extended radio network, direct control of the emissions of the local radio network by the external radio network, and remote control and monitoring of devices within the local radio network from the external radio network.

2. Description of the Prior Art

Cordless telephone systems are well-known in the prior art. A cordless telephone system generally includes a portable cordless handset and a cordless base station which is connected to a telephone company phone system by a landline. The cordless base station has an assigned landline telephone number which allows the user to place and receive calls utilizing the cordless portable handset within a limited range of the cordless portable base station, such as within a home or office. However, due to the limited range present within such systems, a cordless portable handset provides the user with only relatively local radio-telephone communication.

Radio-telephone communication outside the range of a cordless telephone system may also be provided to the user via a cellular telephone system. A cellular telephone system typically includes cellular subscriber units which may be mobile or portable and cellular base stations which are connected to the public telephone company via one or more cellular switching networks. Each cellular subscriber has an assigned cellular telephone number which allows the user to place and receive calls within a widespread range of the cellular base stations, such as throughout a metropolitan area. However, the cost of utilizing a cellular telephone is generally much greater than the cost of utilizing a cordless telephone service.

Recently, in an effort to reduce this problem, a radio telephone has been introduced which may access both a wide-area cellular telephone system and one or more lower-cost cordless base stations at the user's home or office, such as a so-called "microcellular" telephone system within a home or office which may be utilized to provide wireless communications within a limited range. Such a system may use either the landline telephone number or the assigned cellular telephone number to place and receive calls.

A radio telephone which transmits and receives calls in both a cellular and a cordless system typically has the capability of selecting the system within which to operate; however, no provision currently exists for the seamless handoff of an existing telephone connection between a private microcellular or cordless system and the wide-area cellular network.

It should therefore be apparent that a need exists for a method and system which would provide seamless rerouting of existing telephone connections between local radio networks and an extended radio network, direct control of the emissions of the local radio network by the external radio network, and remote control and monitoring of devices within the local radio network from the external radio network.

SUMMARY OF THE INVENTION

It is therefore one object of the present invention to provide an improved telephone communication system.

It is another object of the present invention to provide an improved personal telephone communication system which permits telephone connections via a local radio network and via an extended radio network.

It is yet another object of the present invention to provide an improved personal telephone communication system which permits seamless rerouting of existing telephone connections between a local radio network and an extended radio network.

It is another objective of the present invention to provide a means for the extended radio network to precisely and dynamically control the emissions from the local radio network so as to reduce the potential for harmful interference between the networks.

It is yet another objective to provide monitoring and control capabilities for devices in the local radio network via the extended radio network.

The foregoing objects are achieved as is now described. The personal communication system of the present invention includes one or more mobile stations which operate in conjunction with a private/residential base station and a mobile station emulator to provide seamless rerouting of existing telephone connections between the private/residential base station and a cellular telephone system. The mobile station emulator associated with the private/residential base station communicates with either a cellular network or a personal communications service (PCS) over a digital channel to enable hand-in and hand-out, control the emissions of the private/residential base station, and provide control and monitoring functions to other devices connected to the private/residential base station. Calls directed to a mobile station may be coupled to the private/residential base station via a landline connection to the public-switched telephone network or via a radio-frequency link between the mobile station and a cellular network, either directly or via the mobile station emulator. Devices that are controlled and/or monitored from the cellular network may be connected to the private/residential base station via a radio frequency link or via a wired connection to either the private/residential base station or the mobile station emulator.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF PREFERRED EMBODIMENT

Figure 1:
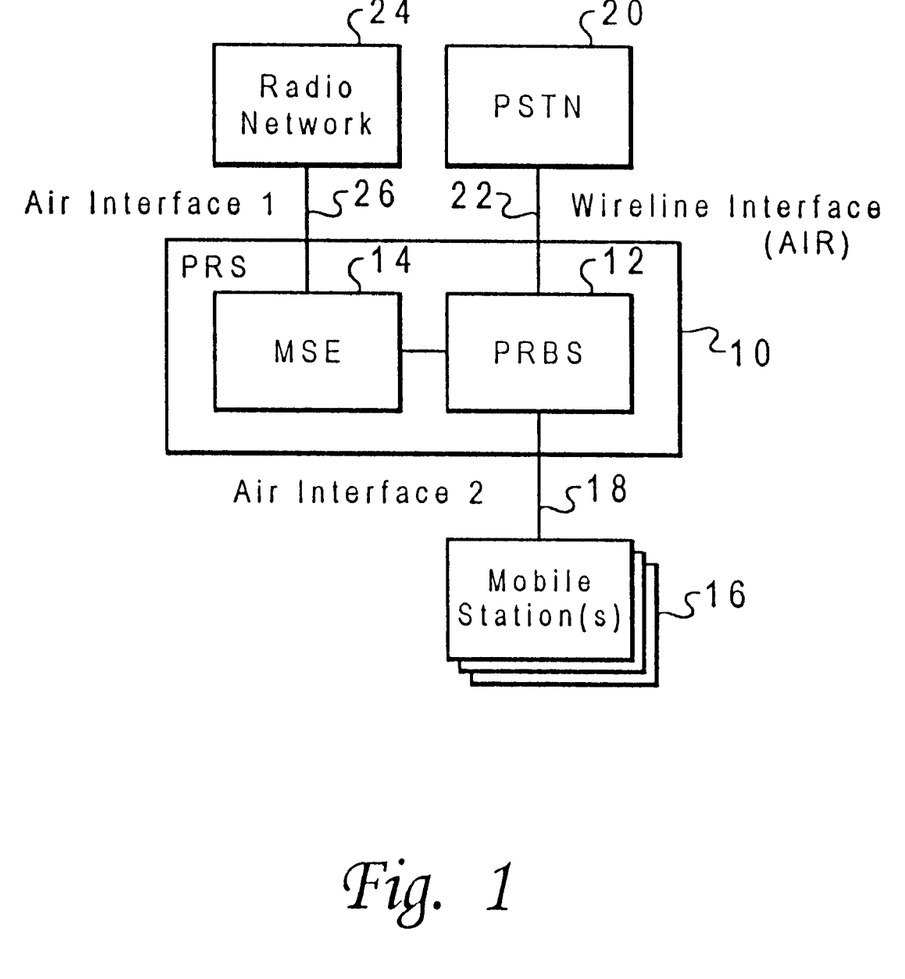
FIG. 1 is a functional block diagram of the personal communication system of the present invention.

With reference now to the figures and, in particular, with reference to FIG. 1, there is depicted a functional block diagram of a personal communication system constructed in accordance with the present invention. As illustrated, the personal communication system includes a Private/Residential System (PRS) which may be utilized to provide a seamless communication path for a user to move between a radio network and a business or residential environment without causing interference to the radio network.

As illustrated in FIG. 1, Private/Residential System 10 includes two subsystems: a Private/Residential Base Station (PRBS) 12 and a Mobile Station Emulator (MSE) 14. The Private/Residential Base Station 12 is utilized to communicate with one or more mobile stations 16 and one or more control devices 17 via a radio-frequency interface, such as air interface 2 as indicated at reference numeral 18. Control devices 17 may include alarm sensors, remote control thermostats or other similar data-link devices.

The Mobile Station Emulator (MSE) 14 communicates with radio network 24 over a radio-frequency interface such as air interface 1, as indicated at reference numeral 26. Radio network 24 may comprise the 800 MHz cellular network, the 900 MHz Global System for a Mobile (GSM) network, the 1800 MHz European Personal Communication System (PCS) network, the 1900 MHz PCS network, the Improved Mobile Telephone System (IMTS) network, the Specialized Mobile Radio (SMR) network, the Enhanced Specialized Mobile Radio (ESMR) network, the Cellular Digital Packet Data (CDPD) network or, another Private/Residential Base Station (PRBS) of the type disclosed herein. Examples of interface 26 may include EIA/TIA-553, IS-54, IS-91, IS-95, IS-136, GSM, and the various PCS standards that include DCS-1800, PCS-1900, DECT, and PACS. Enhancements to this interface may be required in order to provide appropriate messaging between mobile station emulator 14 and radio network 24 in a manner which will be explained in greater detail herein.

The Private Residential Base Station (PRBS) 12 provides a link to the Public Switched Telephone Network (PSTN) 20 over a wireline interface, such as interface 22; however, a wireless or air interface may also be utilized to interconnect the Private/Residential Base Station (PRBS) 12 with the Public Switched Telephone Network (PSTN) 20. Additionally, although described herein as a "Public Switched Telephone Network", any suitable telephone network can be utilized with the present invention.

The connection between Private/Residential Base Station (PRBS) 12 and the Public Switched Telephone Network (PSTN) 20 may include various techniques including ordinary telephone service, Centrex, Integrated Services Digital Network (ISDN), Asynchronous Transfer Mode (ATM), and Frame Relay. Connection to the Public Switched Telephone Network may also be accomplished utilizing a Private Branch Exchange (PBX). Further, the Private/Residential Base Station may be coupled in series or in parallel with customer premises equipment in a business or a residence.

Finally, air interface 2, as indicated at reference numeral 18, may be utilized to couple Private/Residential Base Station (PRBS) 12 to one or more mobile stations 16 utilizing any known radio-frequency interface. In a preferred embodiment of the present invention, the interface between Private/Residential Base Station (PRBS) 12 and mobile stations 16 would typically be accomplished via the same technology utilized to provide the radio-frequency interface between Mobile Station Emulator (MSE) 14 and radio network 24.

Figure 2:
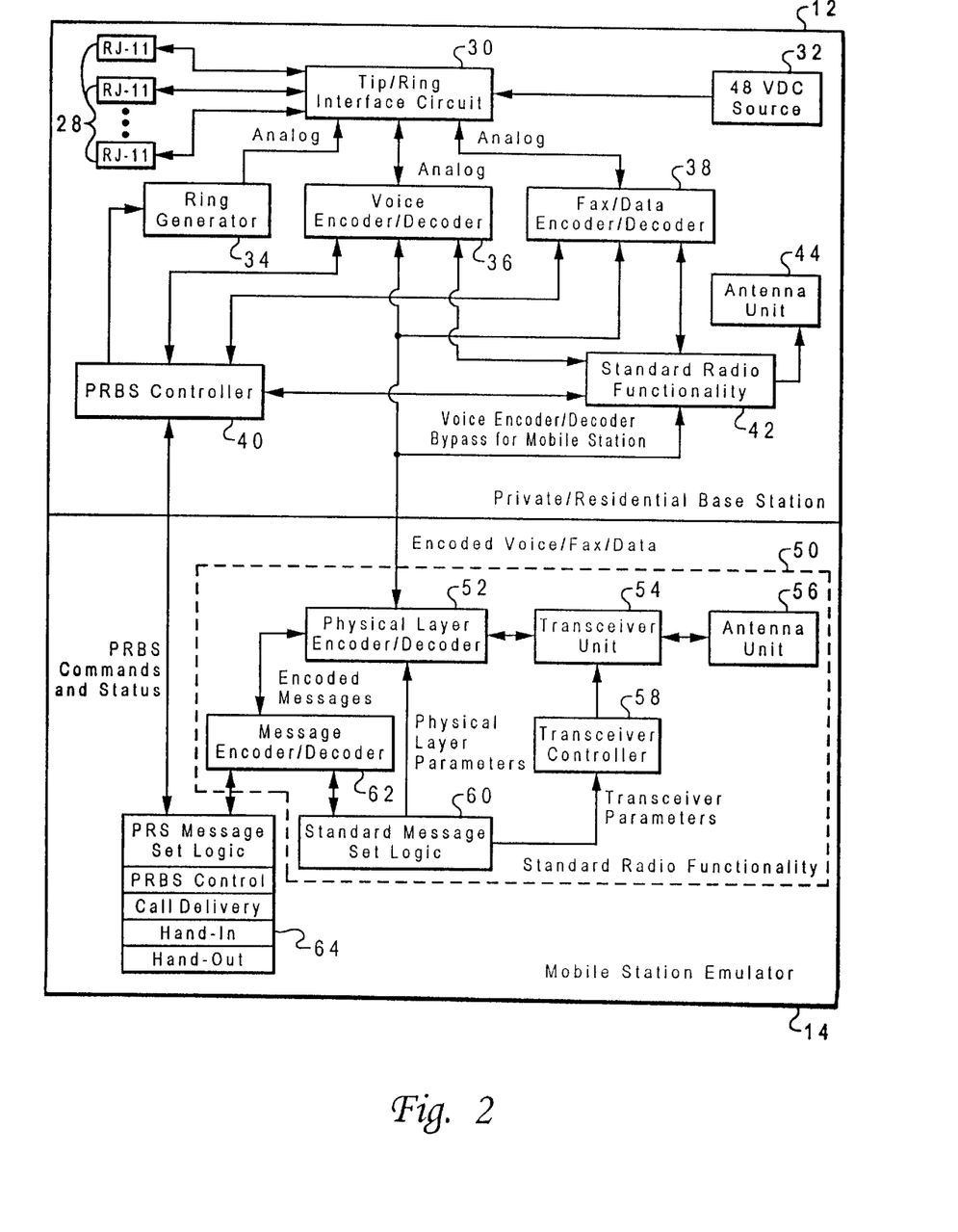
FIG. 2 is a more detailed block diagram of the private/residential system of the present invention.

Referring now to FIG. 2, there is depicted a more detailed block diagram of the private/residential system of FIG. 1. As illustrated, FIG. 2 includes in greater detail the component elements of Private/Residential Base Station 12 and Mobile Station Emulator 14.

Within Private/Residential Base Station 12, an interconnection to the Public Switched Telephone Network is depicted via a tip/ring interface circuit 30, which in turn, is coupled to a plurality of telephone jacks 28. Tip/ring interface circuit 30 is powered by a 48-volt DC power supply 32.

Coupled to tip/ring interface circuit 30, are ring generator 34, voice encoder/decoder 36, and fax/data encoder/decoder 38 to provide ring signals, voice, and fax or data transmission in a manner well-known in the prior art.

A Private/Residential Base Station controller 40 is also depicted. This controller may be implemented utilizing any suitable microprocessor chip and appropriate programming in a manner which will be explained in greater detail herein. One example of such a chip is the MC68HC11 manufactured by Motorola. Finally, standard radio functionality 42 and antennae unit 44 are utilized to provide air interface 2, as indicated at reference numeral 18 within FIG. 1. In this manner, radio-frequency communication between one or more mobile stations and Private/Residential Base Station 12 may be simply and efficiently accomplished.

Referring now to Mobile Station Emulator 14, it may be seen that encoded voice, fax, or data can be coupled to physical layer encoder/decoder 52 within standard radio functionality 50. Physical layer parameters and encoded messages from standard message set logic 60 and message encoder/decoder 62 may also be coupled to physical layer encoder/decoder 52 and thereafter coupled to transceiver unit 54 which, in conjunction with antennae unit 56, provides air interface 1, as indicated as reference numeral 26 within FIG. 1. A private residential system message set logic 64 is also depicted and utilized to initiate various functions within Mobile Station Emulator 14 in a manner which will be explained in greater detail herein.

Figure 3:
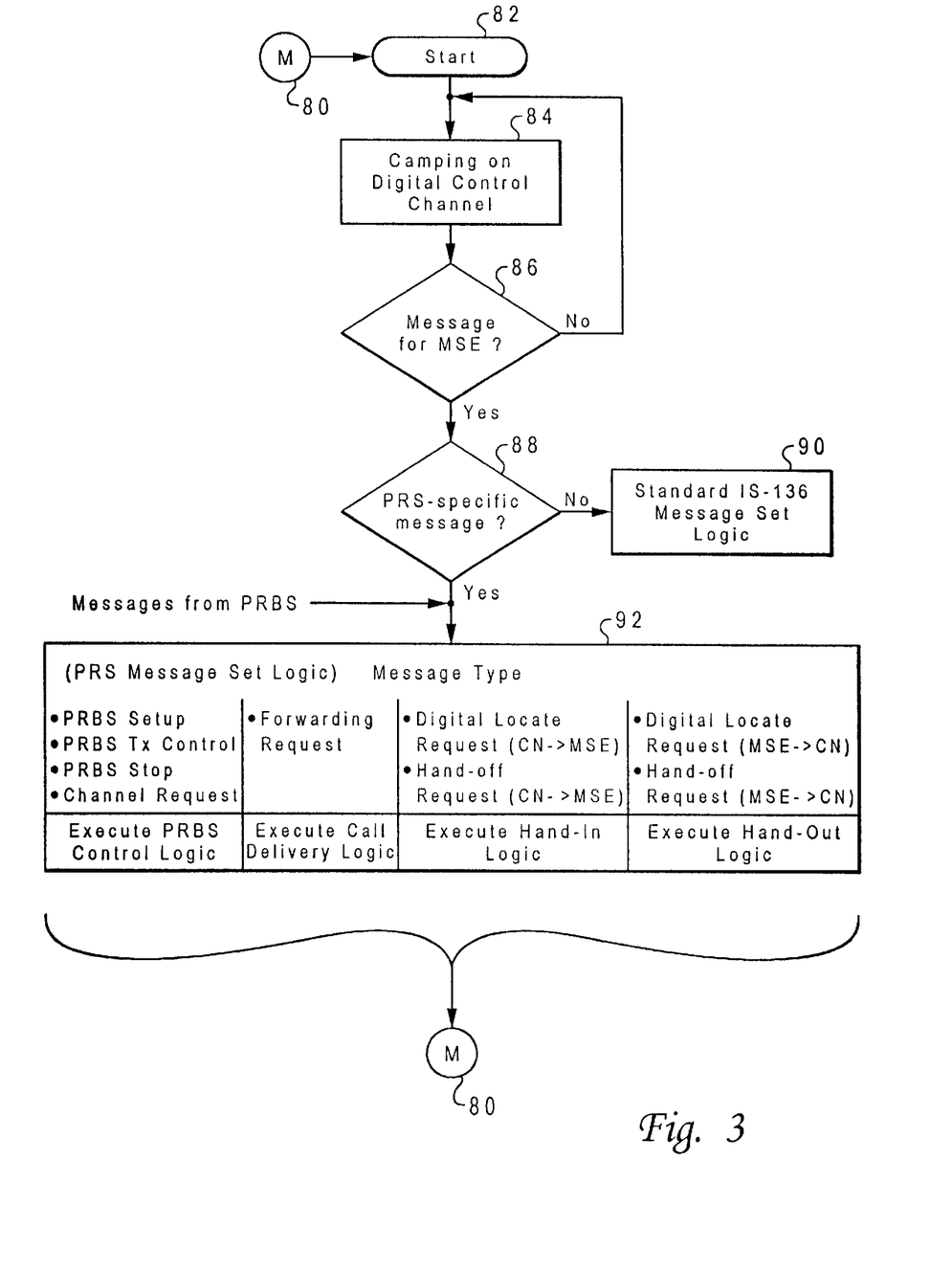
FIG. 3 is a high-level logic-flow diagram illustrating the control logic process of the mobile station emulator of the private/residential system of the present invention.

With reference now to FIG. 3, there is depicted a high-level logic-flow diagram illustrating the control logic process of Mobile Station Emulator 14 of the Private/Residential System of the present invention. As illustrated, this process begins at block 82 and thereafter passes to block 84. Block 84 represents the camping on by Mobile Station Emulator 14 of the Digital Control Channel. Those skilled in the art will appreciate that a modified version of TIA interim standard IS-136 may be utilized for air interface 1 to enable communication between Mobile Station Emulator (MSE) 14 and radio network 24. Assuming that radio network 24 is either the 800 MHz cellular or 1900 MHz PCS network IS-136, this will apply to both networks.

In such an application, Mobile Station Emulator 14 communicates with radio network 24 over the so-called Digital Control Channel (DCCH). That is, when powered, Mobile Station Emulator 14 attempts to register with radio network 24 over the Digital Control Channel (DCCH). Upon a successful registration, Mobile Station Emulator 14 thereafter monitors its assigned paging channel for messages from radio network 24, such as messages to program the private/residential system, instruct the Private/Residential Base Station to start or stop transmitting, request the Private/Residential Base Station to accept a hand-off, or order the Private/Residential Base Station to change its channel or power level. Mobile Station Emulator 14 will thus remain registered with radio network 24 as long as electrical power is present, regardless of whether or not Private/Residential Base Station 12 is transmitting.

Of course, the authentication procedure defined in IS-136 may be utilized to ensure the authenticity of radio network 24 to the private/residential system 10 and of the private/residential system 10 to radio network 24. For example, information broadcast on the Digital Control Channel (DCCH) radio network 24 may be utilized to instruct Mobile Station Emulator 14 whether or not to send an authentication message upon registration and in response to a page. The authentication procedure will require the private/residential system to be assigned an A-key. The A-key may be entered upon installation or programmed over the air under a public key encryption system.

Referring again to FIG. 3, after camping-on the Digital Control Channel, block 86 illustrates a determination of whether or not a message for Mobile Station Emulator 14 has been received. If not, the process returns in an iterative fashion to continue to monitor the Digital Control Channel for messages.

If a message for Mobile Station Emulator 14 is received on the Digital Control Channel, the process passes to block 88. Block 88 illustrates a determination of whether or not the message is a private/residential system specific message, and if not, standard IS-136 message set logic is invoked to process the message. However, messages which are specific to the private/residential system or messages from the Private/Residential Base Station are then coupled to block 92. Block 92 illustrates the private/residential message set logic which is illustrated at reference numeral 64 within FIG. 2.

As depicted, the private/residential message set logic includes four basic types of messages. After executing the selected message type, the control logic process for Mobile Station Emulator 14 returns, via connector 80, in an iterative fashion to once again execute this process.

Figure 4:
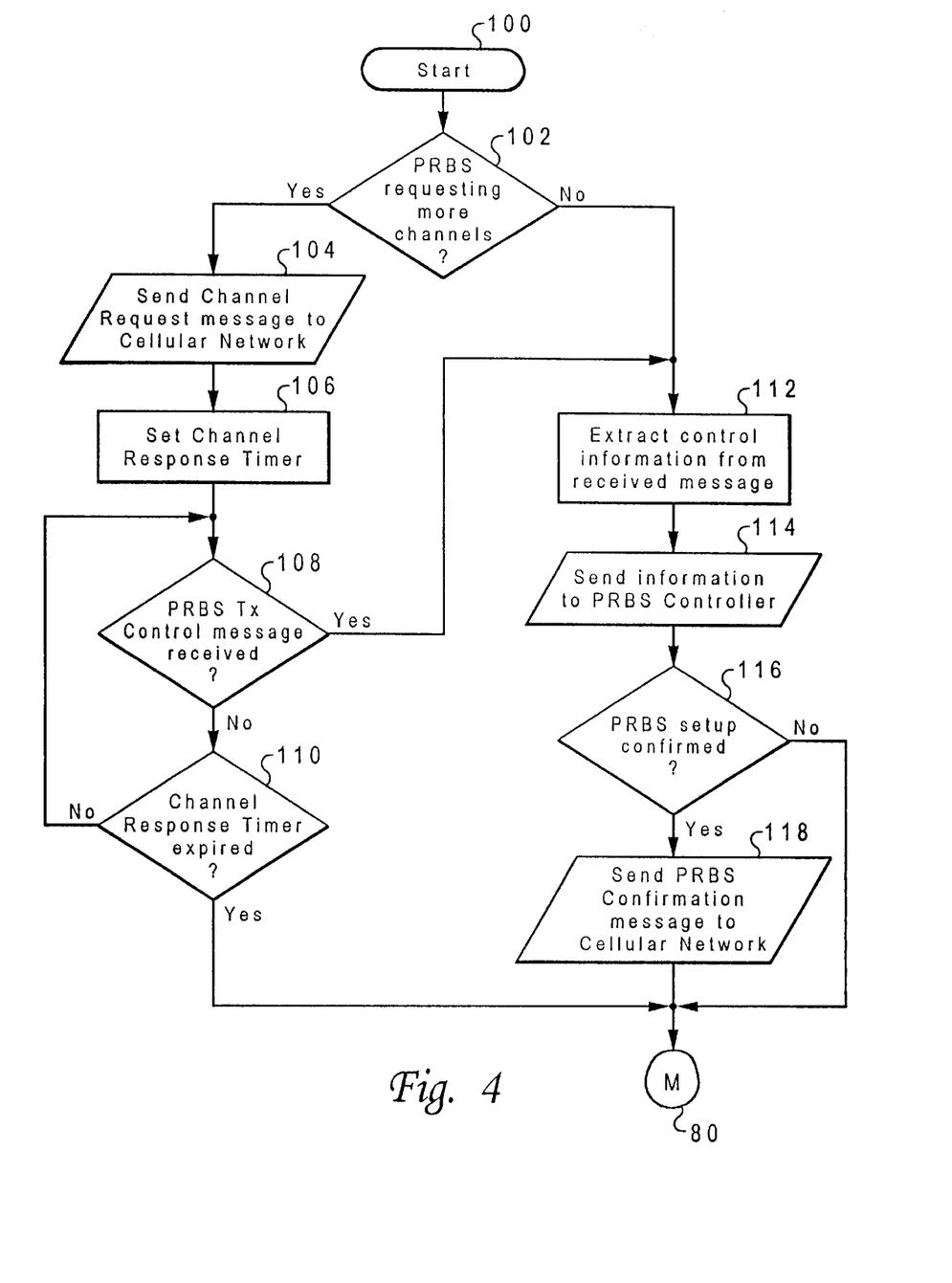
FIG. 4 is a high-level logic-flow diagram illustrating the private/residential base station control-logic process within the mobile station emulator in accordance with the method and system of the present invention.

Referring now to FIGS. 3 and 4, the process by which the Private/Residential Base Station control logic executes will be illustrated. As depicted in block 92 of FIG. 3, one of the private/residential system message types is the execution of the Private/Residential Base Station control logic. This process is depicted within FIG. 4 and begins, as illustrated, at block 100. Thereafter, the process passes to block 102. Block 102 depicts a determination of whether or not the message which initiated this process was a message from Private/Residential Base Station 12 requesting additional channels for communication. If so, the process passes to block 104. Block 104 illustrates the sending of a channel request message to the cellular network, depicted in FIG. 1 as radio network 24. Next, the process passes to block 106. Block 106 illustrates the setting of the channel response timer.

Next, the process passes to block 108. Block 108 illustrates a determination of whether or not a Private/Residential Base Station transmission control message has been received, and if not, the process passes to block 110. Block 110 depicts a determination of whether or not the channel response timer has expired, and if not, the process returns to block 108 in an iterative fashion to await receipt of a control message. However, in the event the channel response timer has expired, the process passes to connector 80 and returns to the control logic for Mobile Station Emulator 14, as depicted in FIG. 3.

Referring again to block 102, in the event the message received is not a message from the Private/Residential Base Station requesting more channels or, referring to block 108, in the event that a Private/Residential Base Station transmission control message has been received, the process passes to block 112. Block 1 12 illustrates the extraction of control information from the received message, and the process then passes to block 114. Block 114 depicts the sending of the extracted control information to the Private/Residential Base Station controller. The extracted control information may be utilized to control the emissions of the Private/Residential Base Station and control the operation of mobile stations and/or control devices which may be coupled to the Private/Residential Base Station. Such control may include variations in the power transmitted by a device for the channels utilized by that device.

Next, the process passes to block 116 which depicts a determination of whether or not the Private/Residential Base Station setup in response to that information has been confirmed. If not, the process passes via connector 80 and returns to the control logic process of Mobile Station Emulator 14 as depicted in FIG. 3. Alternatively, in the event a Private/Residential Base Station is confirmed, the process passes to block 118. Block 118 illustrates the sending of the Private/Residential Base Station confirmation message to the cellular network, illustrated within FIG. 1 as radio network 24. Thereafter, as described above, the process returns in an iterative fashion via connector 80.

Figure 5:
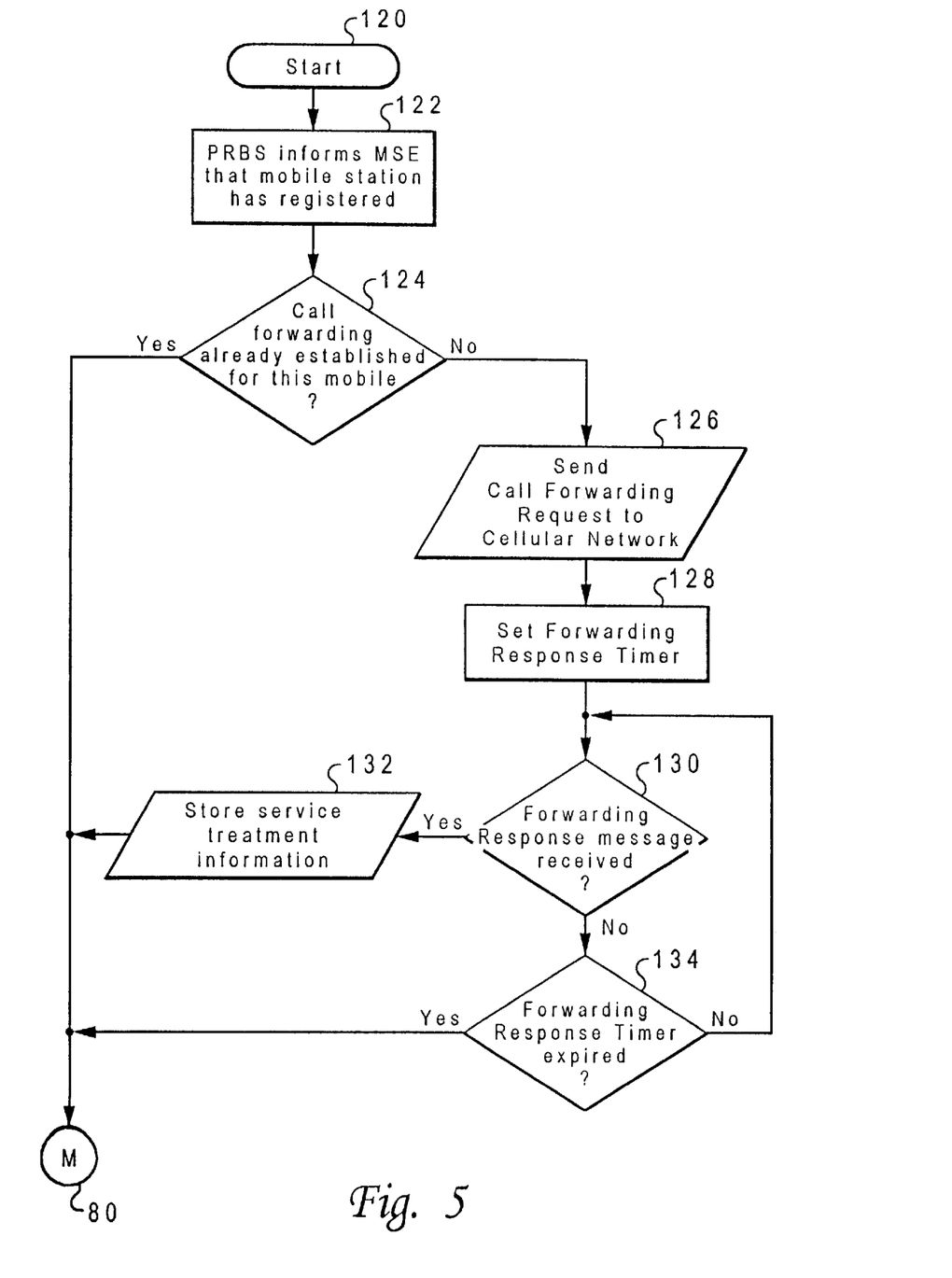
FIG. 5 is a high-level logic-flow diagram illustrating a call-delivery process within the mobile station emulator in accordance with the method and system of the present invention.

With reference now to FIG. 5, there is depicted a high-level logic-flow diagram which illustrates a call delivery process in accordance with the method and system of the present invention. This process is entered from block 92 of FIG. 3 upon a determination that call delivery logic should be executed. As above, this process begins at block 120 and thereafter passes to block 122. Block 122 depicts the Private/Residential Base Station informing the Mobile Station Emulator that a mobile station has registered. Those skilled in the art will appreciate that registration is the process by which the Mobile Station Emulator or a mobile station informs the serving system, whether radio network 24 or Private/Residential Base Station 12, that the mobile station is powered-on and awaiting pages or messages. Next, the process passes through block 124. Block 124 illustrates a determination of whether or not call forwarding has already been established for this mobile station, and if so, the process returns, in an iterative fashion, via connector 80.

Still referring to block 124, in the event call forwarding is not already established for this mobile station, the process passes to block 126. Block 126 depicts the transmission of a call-forwarding request to the cellular network or radio network 24. The process then passes to block 128 which depicts the setting of the forwarding response timer. Next, the process passes to block 130 which illustrates a determination of whether or not the forwarding response message has been received, and if so, the service treatment information is stored, as depicted at block 132. And the process returns, in an iterative fashion, via connector 80.

Referring again to block 130, in the event the forwarding response message has not been received, the process passes to block 134. Block 134 illustrates a determination of whether or not the forwarding response timer has expired, and if so, the process returns, in an iterative fashion, via connector 80. However, in the event the forwarding response timer has not expired, the process returns to block 130 in an iterative fashion to await receipt of the forwarding response message.

Figure 6:
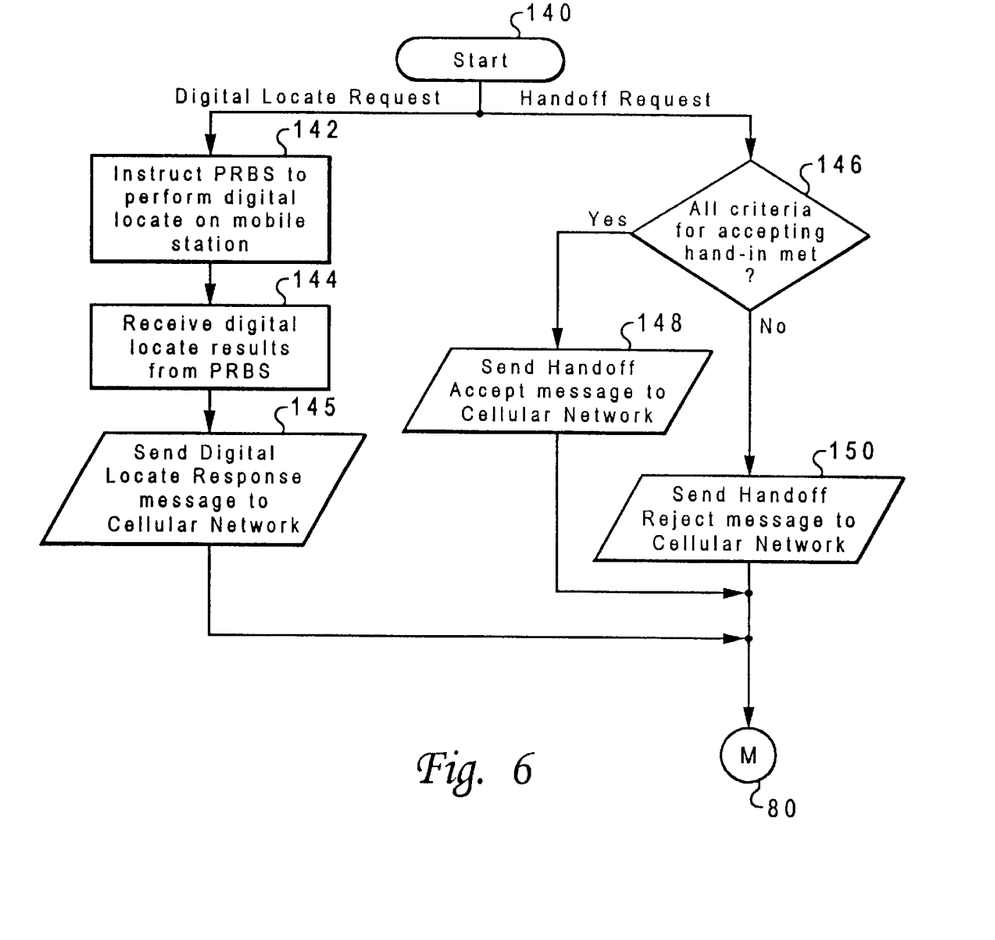
FIG. 6 is a high-level logic-flow diagram illustrating a call hand-in process within the mobile station emulator in accordance with the method and system of the present invention.

Referring now to FIG. 6, there is depicted a high-level logic-flow diagram illustrating a call hand-in process in accordance with the method and system of the present invention.

As illustrated, the process begins at block 140. Thereafter, if the message received is a digital locate request, the process passes to block 142. Block 142 illustrates the instruction of the Private/Residential Base Station to perform a digital locate on a particular mobile station. Those skilled in the art will appreciate that digital locate is the process of confirming that the entity performing the digital locate can see the mobile station in question with adequate received signal strength. This may be determined, as those skilled in the art will appreciate, by examining received signal strength indicators, or the bit error rate (BER) in a digital system. Thereafter, the process passes to block 144. Block 144 illustrates the receipt of the digital locate results from the Private/Residential Base Station, and the digital locate response is then transmitted to the cellular network, illustrated as radio network 24 of FIG. 1, as depicted in block 145. The process then returns, in an iterative fashion, via connector 80.

Referring again to block 140, in the event the message is a hand-off request, the process passes to block 146. Block 146 illustrates a determination of whether or not all criteria for accepting a hand-in to the private/residential system have been met. If so, the process passes to block 148 which depicts the transmission of a hand-off-accept message to the cellular network, illustrated as radio network 24 in FIG. 1. Thereafter, the process returns, in an iterative fashion, via connector 80.

Finally, referring again to block 146, in the event all criteria for accepting a hand-in are not met, the process passes to block 150. Block 150 illustrates the transmission of a hand-off reject message to the cellular network, and this process returns, in an iterative fashion, via block 80.

Figure 7:
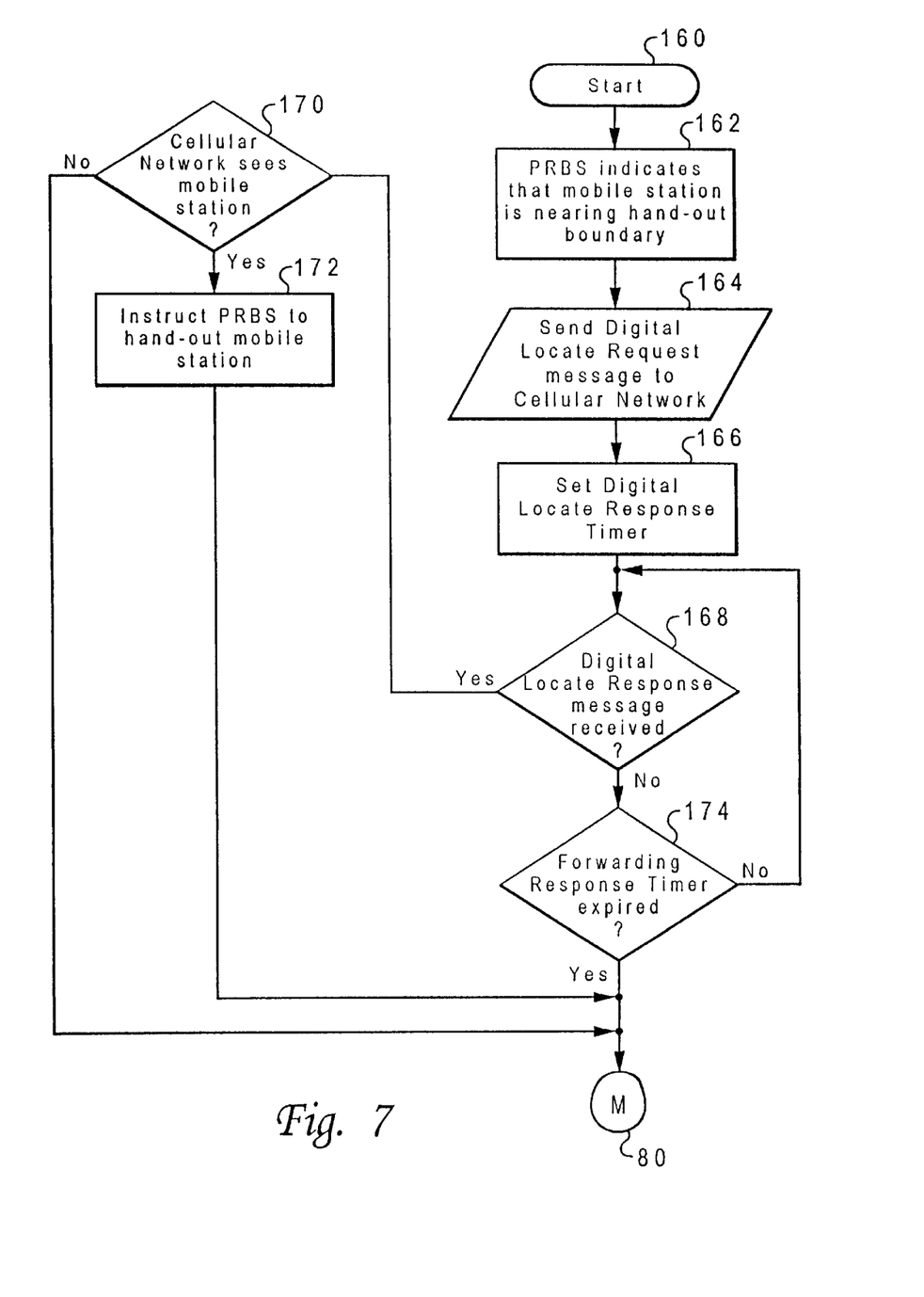
FIG. 7 is a high-level logic-flow diagram illustrating a call hand-out process within the mobile station emulator in accordance with the method and system of the present invention.

With reference now to FIG. 7, there is depicted a high-level logic-flow diagram illustrating a call hand-out process in accordance with the method and system of the present invention. As depicted, this process begins at block 160. Thereafter, the process passes to block 162, which illustrates a determination of an indication by the Private/Residential Base Station that a mobile station is nearing the hand-out boundary. That is, the limit to which radio communication between the Private/Residential Base Station and the mobile station can occur.

Next, in preparation of accomplishing a hand-out, a digital locate message is transmitted to the cellular network, as depicted at block 164. A digital locate response timer is then set, as depicted at block 166, and the process then passes to block 168.

Block 168 illustrates a determination of whether or not the digital locate response message has been received, and if so, the process passes to block 170. Block 170 depicts a determination of whether or not the cellular network sees the mobile station, and if not, the process returns, in an iterative fashion, via connector 80. However, in the event the cellular network does "see" the mobile station, the process passes to block 172. Block 172 illustrates an instruction to the Private/Residential Base Station to hand-out the mobile station to the cellular network.

Referring again to block 168, in the event the digital locate response message has not been received, the process passes to block 174. Block 174 illustrates a determination of whether or not the digital locate response timer has expired, and if not, the process returns, in an iterative fashion, to block 168 to await receipt of the digital locate response message. However, in the event the digital locate response timer has expired, the process returns, in an iterative fashion, via connector 80.

Figure 8:
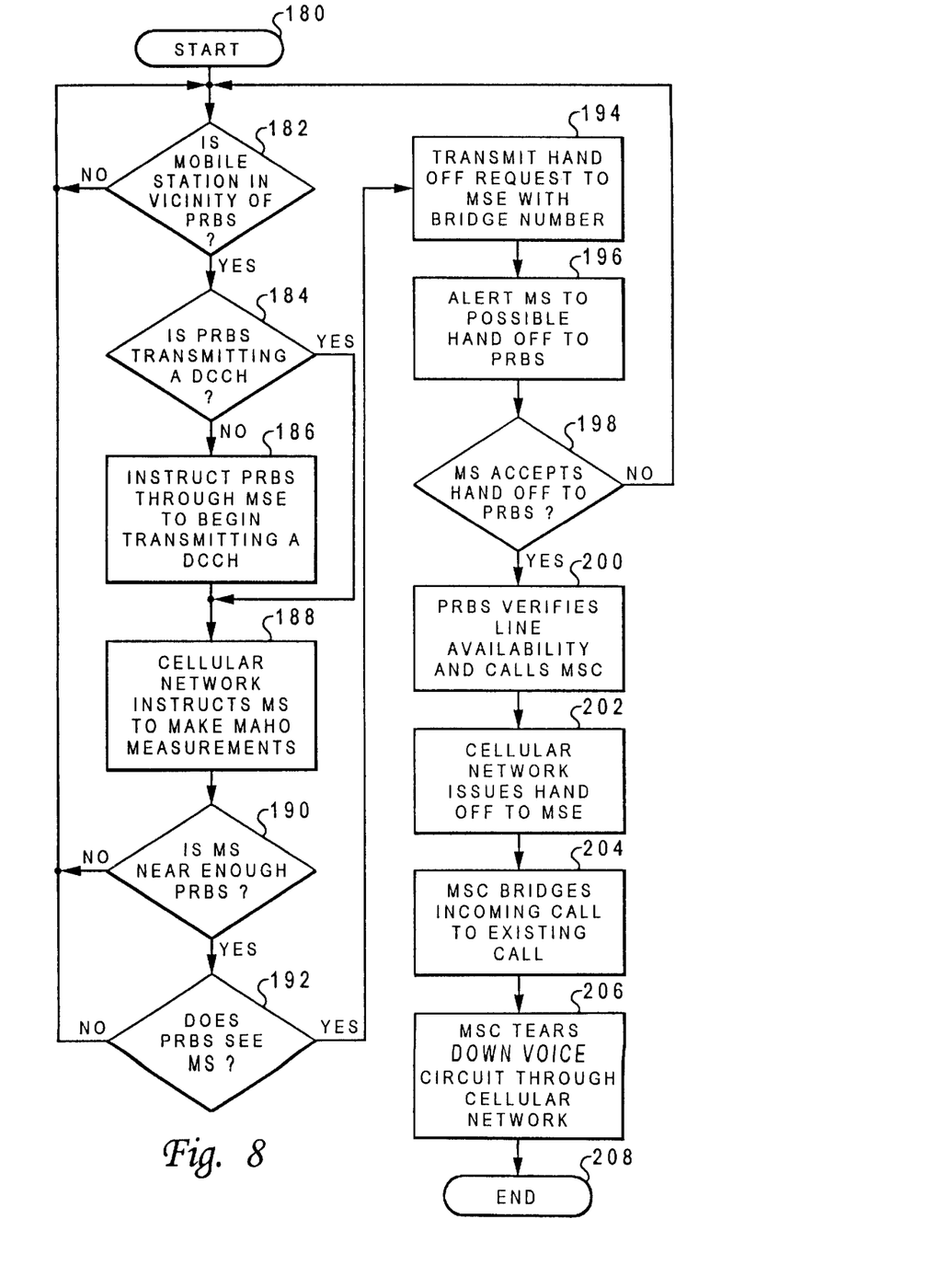
FIG. 8 is a high-level logic-flow diagram illustrating a specific example of a hand-in process in accordance with the method and system of the present invention.

Referring now to FIG. 8, there is depicted a high-level logic-flow diagram illustrating a specific example of a hand-in process in accordance with the method and system of the present invention. As illustrated, this process begins at block 180 and thereafter passes to block 182. Block 182 depicts a determination of whether or not a mobile station (MS) is in the vicinity of a Private/Residential Base Station. If not, the process merely waits, in an iterative fashion, for this circumstance to occur. However, if a mobile station is within the vicinity of a Private/Residential Base Station, as determined at block 182, the process passes to block 184. Block 184 depicts a determination of whether or not the PRBS has been instructed to transmit a DCCH. If not, the cellular network instructs the PRBS to begin transmitting, as depicted in block 186. If the PRBS is already transmitting a DCCH, or has been instructed to do so as a result of determining that a mobile station is in the vicinity of the PRBS (block 182), then control passes to block 188.

Block 188 illustrates the cellular network instructing the mobile station to make so-called "MAHO" (Mobile-Assisted Hand-Off) measurements. Thereafter, the process passes to block 190. Block 190 illustrates a determination of whether or not the mobile station is sufficiently close to the Private/Residential Base Station for a hand-off. If not, the process returns to block 182 in an iterative fashion.

However, if the mobile station is sufficiently close to the Private/Residential Base Station (PRBS), as determined at block 190, the process passes to block 192. Block 192 illustrates a determination of whether or not the PRBS "sees" the mobile station. If not, the process returns to block 182 in an iterative fashion as described above.

Referring again to block 192, if the PRBS does see the mobile station, the process passes to block 194. Block 194 illustrates the transmission of a hand-off request to the Mobile Station Emulator with a bridge number provided by the cellular system. Next, the mobile station is alerted to the possibility of a hand-off to the Private/Residential Base Station, as depicted at block 196.

Next, block 198 illustrates a determination of whether or not the mobile station accepts the hand-off to the Private/

Residential Base Station. If not, the process returns, in an iterative fashion to block 182. However, in the event the mobile station operator indicates acceptance of the hand-off to the Private/Residential Base Station, the process passes to block 200. Block 200 depicts the verification of line availability of the Private/Residential Base Station and the calling of the mobile switching center. The cellular network then issues a hand-off to the mobile station, as depicted at block 202. The bridge number provided to the MSE is then utilized by the Private/Residential Base Station to contact the mobile station switch, as set forth above in block 200, and the mobile station switch bridges the incoming call to the existing call, as depicted at block 204. Finally, the mobile station switch tears down the voice circuit through the cellular network which is no longer required as illustrated at block 206. The process then terminates, as depicted at block 208.

Figure 9:
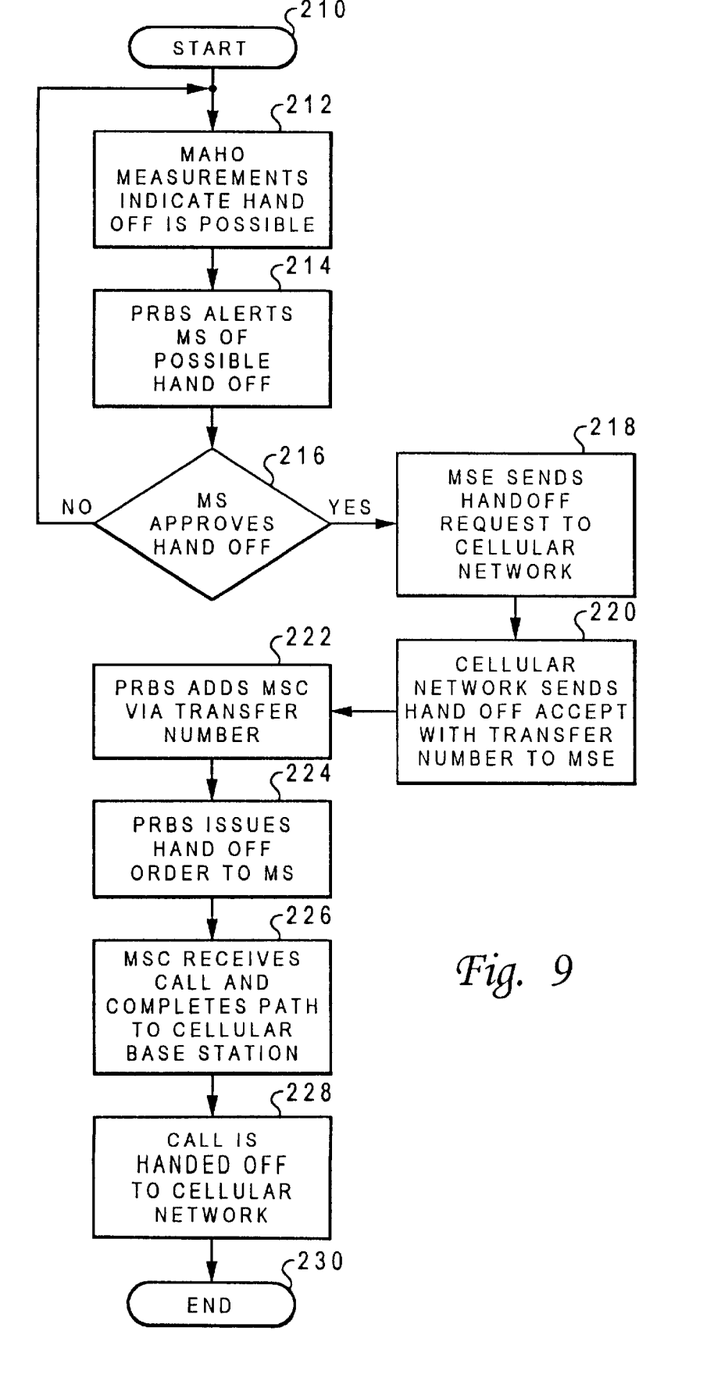
FIG. 9 is a high-level logic-flow diagram illustrating a specific example of a hand-out process in accordance with the method and system of the present invention.

With reference now to FIG. 9, there is depicted a high-level logic-flow diagram illustrating a specific example of a hand-out process in accordance with the method and system of the present invention. As depicted, this process begins at block 210 and thereafter passes to block 212. Block 212 indicates a situation in which the MAHO measurements made by the mobile station on cellular network transmissions indicate that a hand-off is possible. Thereafter, the process passes to block 214. Block 214 illustrates the alerting of the mobile station by the Private/Residential Base Station of a possible hand-off. Next, as depicted at block 216, a determination is made as to whether or not the mobile station approves of the hand-off. If the user of the mobile station declines the hand-off (and presumably moves back into closer proximity to the Private/Residential Base Station), the process returns to block 212 in an iterative fashion.

Still referring to block 216, in the event the mobile station user indicates approval of the hand-off, the process passes to block 218. Block 218 illustrates a hand-off request being transmitted by the Mobile Station Emulator to the cellular network. Next, as depicted at block 220, the cellular network sends a hand-off accept with a transfer number to the MSE to be utilized by the PRBS. The Private/Residential Base Station then adds the mobile switching center via the provided transfer number, as depicted at block 222. Next, the Private/Residential Base Station issues a hand-off order to the mobile station, as depicted at block 224.

Thereafter, the mobile switching center receives the call via the transfer number and completes a path to a cellular base station as illustrated in block 226. Finally, as depicted at block 228, the call is handed off to the cellular network. The process then terminates, as depicted in block 230.

Figure 10:
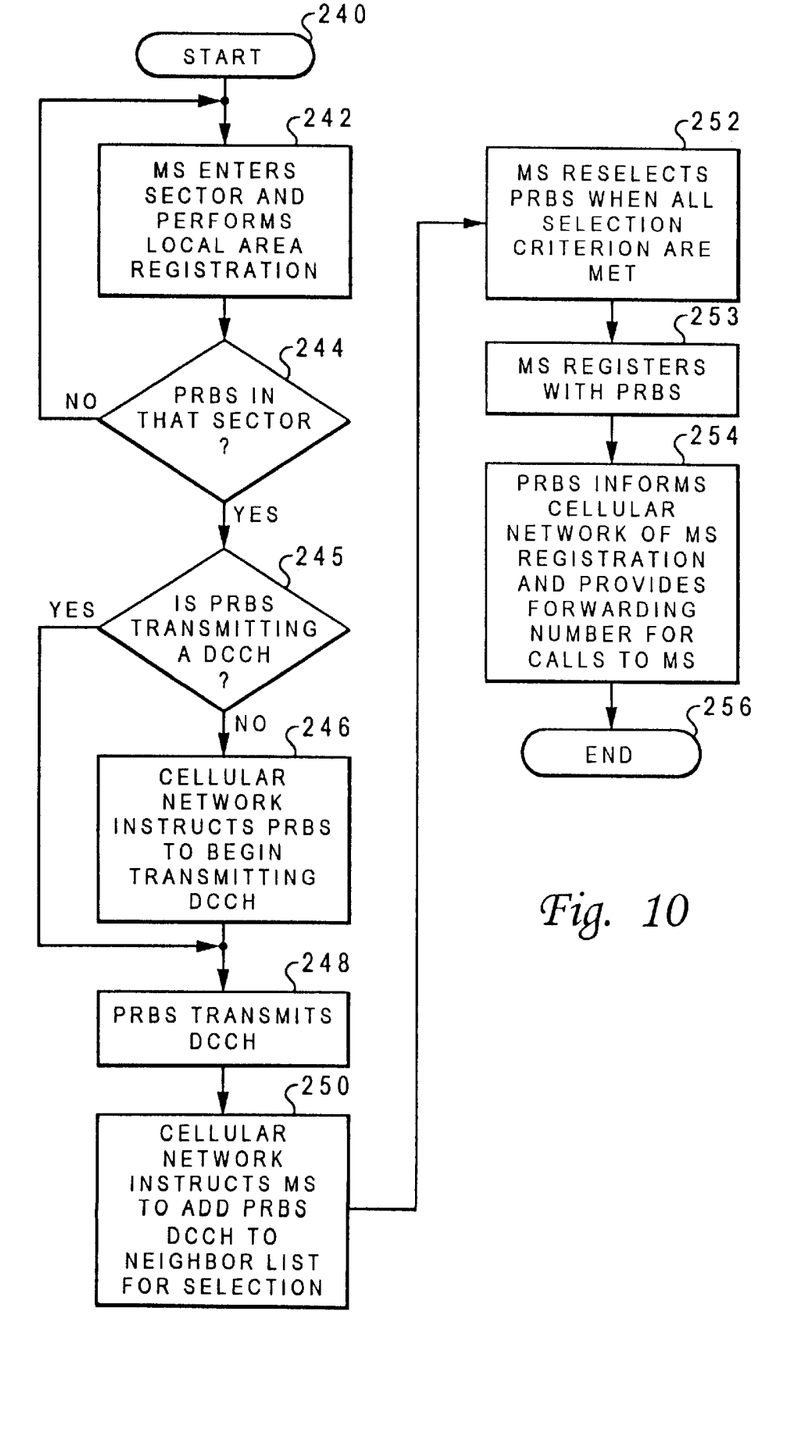
FIG. 10 is a high-level logic-flow diagram illustrating a process for reselection to the private/residential system by a mobile station in accordance with the method and system of the present invention.

Finally, referring to FIG. 10, there is depicted a high-level logic-flow diagram illustrating a process for reselection to the private/residential system by a mobile station in accordance with the method and system of the present invention. Of course, those skilled in the art will appreciate that such reselection will occur when the mobile station is in the vicinity of the Private/Residential Base Station; however, no telephone call is currently in effect.

As depicted, this process begins at block 240 and thereafter passes to block 242. Block 242 illustrates the entering of a sector by the mobile station and the performance of a local-area registration. That is, the process by which a mobile station identifies itself to the cellular network when it enters a particular cell or sector of a cell.

Next, the process passes to block 244. Block 244 illustrates a determination of whether or not a Private/Residential Base Station exists within the sector within which the mobile station has registered. If no, the process returns, in an iterative fashion, to block 242.

Still referring to block 244, if a Private/Residential Base Station exists within that sector, the process passes to block 245. Block 245 illustrates a determination of whether or not the PRBS is transmitting a DCCH. If no, then control passes to block 246, else 248. Block 246 illustrates the cellular network instructing the Private/Residential Base Station to begin transmitting a Digital Control Channel (DCCH). Thereafter, the Private/Residential Base Station transmits the appropriate Digital Control Channel, as depicted at block 248. Additionally, as illustrated at block 250, the cellular network instructs the mobile station to add the Private/Residential Base Station Digital Control Channel to its neighbor list for possible selection.

Referring now to block 252, the process illustrated therein depicts the reselection to the Private/Residential Base Station by the mobile station when all required reselection criteria have been met. Block 253 illustrates the mobile station registering with the PRBS after reselection. Thereafter, as depicted at block 254, the Private/Residential Base Station informs the cellular network of the registration of the mobile station and provides a forwarding number to be used by the cellular network for telephone calls directed to the mobile station. The process then terminates, as depicted at block 256.

While the invention has been particularly shown and described with reference to a preferred embodiment, it will be understood by those skilled in the art that various changes in form and detail may be made therein without departing from the spirit and scope of the invention.

What is claimed is:

1. A personal communication system for use within a business or residential environment comprising:
   a Private/Residential Base Station within said personal communication system for communicating with one or more mobile stations within a limited geographic area utilizing radio-frequency communications;
   a link connecting said Private/Residential Base Station and a switched telephone network;
   a Mobile Station Emulator within said personal communication system for communicating with a cellular telephone system utilizing radio-frequency communications, wherein said cellular telephone system is coupled to said switched telephone network; and
   control means within said personal communication system coupled to said Private/Residential Base Station and said Mobile Station Emulator for seamlessly rerouting an existing telephone connection between a mobile station and said switched telephone network utilizing both said link and said cellular telephone system in response to determined communication channel parameters.

2. The personal communication system according to claim 1 wherein said link connecting said Private/Residential Base Station and a switched telephone network comprises a wired connection.

3. The personal communication system according to claim 1 wherein said communication channel parameters comprise an indication of received signal strength.

4. The personal communication system according to claim 1 wherein said communication channel parameters comprise a bit error rate signal.

5. A personal communication system for use within a business or residential environment comprising:

a Private/Residential Base Station within said personal communication system for communicating with one or more mobile stations within a limited geographic area utilizing radio-frequency communications.

a link connecting said Private/Residential Base Station and a switched telephone network;

a Mobile Station Emulator within said personal communication system for communicating with a cellular telephone system utilizing radio-frequency communications, wherein said cellular telephone system is coupled to said switched telephone network; and control means within said personal communication system coupled to said Private/Residential Base Station and said Mobile Station Emulator for seamlessly rerouting an existing telephone connection between a mobile station and said switched telephone network utilizing both said link and said cellular telephone system and for controlling operation of said Private/Residential Base Station in response to commands transmitted from said cellular telephone system to said Mobile Station Emulator.

6. The personal communication system according to claim 5 further including one or more control devices and a link between said control means and said one or more control devices.

7. The personal communication system according to claim 6 wherein said control means includes means for directing said one or more control devices via said link between said control means and said one or more control devices.

8. The personal communication system according to claim 5 wherein said link connecting said Private/Residential Base Station and a switched telephone network comprises a wired connection.

9. The personal communication system according to claim 5 wherein said control means further includes means for controlling power transmitted by said Private/Residential Base Station.

10. A personal communication system for use within a business or residential environment comprising:

a Private/Residential Base Station within said personal communication system for communicating with one or more mobile stations within a limited geographic area utilizing radio-frequency communications.

a link connecting said Private/Residential Base Station and a switched telephone network;

a Mobile Station Emulator within said personal communication system for communicating with a cellular telephone system utilizing radio-frequency communications, wherein said cellular telephone system is coupled to said switched telephone network;

notification means within said personal communication system coupled to said Private/Residential Base Station and said Mobile Station Emulator for notifying a user at a particular mobile station of an impending rerouting of an existing telephone connection between said mobile station and said switched telephone network utilizing both said link and said cellular telephone system; and control means within said personal communication system coupled to said Private/Residential Base Station and said Mobile Station Emulator for seamlessly rerouting an existing telephone connection between a mobile station and said switched telephone network utilizing both said link and said cellular telephone system in response to an input from said user at said particular mobile station and determined communication channel parameters.

11. The personal communication system according to claim 10 wherein said link connecting said Private/Residential Base Station and a switched telephone network comprises a wired connection.

12. The personal communication system according to claim 10 wherein said communication channel parameters comprise an indication of received signal strength.

13. The personal communication system according to claim 10 wherein said communication channel parameters comprise a bit error rate signal.

14. A personal communication system for use within a business or residential environment comprising:

a Private/Residential Base Station within said personal communication system for communicating with one or more mobile stations within a limited geographic area utilizing radio-frequency communications.

a link connecting said Private/Residential Base Station and a switched telephone network;

a Mobile Station Emulator within said personal communication system for communicating with a cellular telephone system utilizing radio-frequency communications, wherein said cellular telephone system is coupled to said switched telephone network; and control means within said personal communication system coupled to said Private/Residential Base Station and said Mobile Station Emulator for seamlessly rerouting an existing telephone connection between a mobile station and said switched telephone network utilizing both said link and said cellular telephone system and for causing said Private/Residential Base Station to emit a Digital Control Channel (DCCH) signal in response to a determination within said cellular telephone system that a particular mobile station is within a specified proximity of said Private/Residential Base Station and for notifying said particular mobile station to consider said Private/Residential Base Station for reselection.

15. The personal communication system according to claim 14 wherein said link connecting said Private/Residential Base Station and a switched telephone network comprises a wired connection.

16. The personal communication system according to claim 14 further including means for directing said cellular telephone system to direct telephone connections addressed to said particular mobile station to said Private/Residential Base Station in response to a reselection of said Private/Residential Base Station by said particular mobile station.

* * * * *